United States Patent
Yu et al.

(10) Patent No.: US 10,804,507 B2
(45) Date of Patent: Oct. 13, 2020

(54) POUCH CASE FOR SECONDARY BATTERY AND POUCH-TYPE SECONDARY BATTERY COMPRISING THE SAME

(71) Applicant: LG CHEM, LTD., Seoul (KR)

(72) Inventors: Hyung Kyun Yu, Daejeon (KR); Sang Hun Kim, Daejeon (KR); Won Pill Hwang, Daejeon (KR); Soo Ji Hwang, Daejeon (KR); Sang Suk Jung, Daejeon (KR)

(73) Assignee: LG Chem, Ltd. (KR)

( * ) Notice: Subject to any disclaimer, the term of this patent is extended or adjusted under 35 U.S.C. 154(b) by 199 days.

(21) Appl. No.: 15/542,513

(22) PCT Filed: Mar. 30, 2016

(86) PCT No.: PCT/KR2016/003276
§ 371 (c)(1),
(2) Date: Jul. 10, 2017

(87) PCT Pub. No.: WO2016/159662
PCT Pub. Date: Oct. 6, 2016

(65) Prior Publication Data
US 2018/0269434 A1 Sep. 20, 2018

(30) Foreign Application Priority Data
Mar. 31, 2015 (KR) .................. 10-2015-0045310

(51) Int. Cl.
*H01M 2/02* (2006.01)
*B32B 1/02* (2006.01)
(Continued)

(52) U.S. Cl.
CPC .............. *H01M 2/029* (2013.01); *B32B 1/02* (2013.01); *B32B 27/08* (2013.01); *B32B 27/18* (2013.01);
(Continued)

(58) Field of Classification Search
CPC ... B32B 1/02; B32B 2323/00; B32B 2457/10; B32B 2250/242; B32B 2250/03;
(Continued)

(56) References Cited

U.S. PATENT DOCUMENTS 6,326,551 B1 * 12/2001 Adams ............... H01B 11/1804
174/113 C
2005/0112461 A1 * 5/2005 Amine .................... B32B 15/08
429/185
(Continued)

FOREIGN PATENT DOCUMENTS

CN 101508368 A 8/2009
JP 8-298103 A 11/1996
(Continued)

OTHER PUBLICATIONS

International Search Report issued in PCT/KR2016/003276 (PCT/ISA/210), dated Jul. 12, 2016.
(Continued)

*Primary Examiner* — Jonathan G Jelsma
*Assistant Examiner* — Omar M Kekia
(74) *Attorney, Agent, or Firm* — Lerner, David, Littenberg, Krumholz & Mentlik, LLP

(57) ABSTRACT

The present disclosure relates to a pouch case for a secondary battery, and a secondary battery comprising the same, and in particular, to a pouch case for a secondary battery fabricated by laminating an inner resin layer, a middle resin layer and an outer resin layer, wherein the inner resin layer comprises a polyolefin-based resin and a thermosetting moisture absorber, and a secondary battery comprising the same.

12 Claims, 3 Drawing Sheets

(51) Int. Cl.
*B32B 27/08* (2006.01)
*B32B 27/18* (2006.01)
*B32B 27/32* (2006.01)
*H01M 10/0525* (2010.01)
*B32B 15/088* (2006.01)
*B32B 27/20* (2006.01)
*B32B 27/34* (2006.01)
*B32B 15/085* (2006.01)
*B32B 7/12* (2006.01)
*B32B 3/02* (2006.01)
*B32B 27/36* (2006.01)
*B32B 15/09* (2006.01)

(52) U.S. Cl.
CPC ........... *B32B 27/32* (2013.01); *H01M 2/0262* (2013.01); *H01M 2/0275* (2013.01); *H01M 2/0277* (2013.01); *H01M 2/0295* (2013.01); *H01M 10/0525* (2013.01); *B32B 3/02* (2013.01); *B32B 7/12* (2013.01); *B32B 15/085* (2013.01); *B32B 15/088* (2013.01); *B32B 15/09* (2013.01); *B32B 27/20* (2013.01); *B32B 27/34* (2013.01); *B32B 27/36* (2013.01); *B32B 2250/03* (2013.01); *B32B 2250/24* (2013.01); *B32B 2250/242* (2013.01); *B32B 2307/732* (2013.01); *B32B 2323/00* (2013.01); *B32B 2439/62* (2013.01); *B32B 2457/10* (2013.01)

(58) Field of Classification Search
CPC ......... B32B 27/32; B32B 27/18; B32B 27/08; B32B 2439/62; B32B 2250/24; B32B 7/12; B32B 2307/732; B32B 3/02; B32B 27/36; B32B 2/0295; B32B 7/08; B32B 27/34; B32B 27/20; B32B 15/085; B32B 15/088; B32B 15/09; H01M 2/029; H01M 2/0277; H01M 2/0262; H01M 10/0525; H01M 2/0275; H01M 2/0295
USPC ........................................................ 429/177
See application file for complete search history.

(56) References Cited

U.S. PATENT DOCUMENTS

2007/0207379 A1 9/2007 Hatta et al.
2008/0050651 A1 2/2008 Wakai et al.
2014/0342204 A1 11/2014 Hatta et al.
2016/0133882 A1 5/2016 Lee et al.

FOREIGN PATENT DOCUMENTS

| JP | 9-22728 A | 1/1997 |
| JP | 2007-265989 A | 10/2007 |
| JP | 4604025 B2 | 12/2010 |
| KR | 10-2015-0026489 A | 3/2015 |

OTHER PUBLICATIONS

Zhang Chun-xiao et al., "Research progress in moisture-absorbing polymers", Modern Chemical Industry, vol. 28, No. 10, Oct. 2008, pp. 14-17 (with English Abstract).
Chinese Search Report for Application No. 201680005911.0, dated May 29, 2020, pp. 1-2.
Liu Yungqi et al., "Material Chemistry", China Material Publishing Company, Feb. 28, 2013, pp. 620-624.
Xia Yuzheng et al., "Micro-Polymer Chemical Industry and Application thereof", Micro-Chemical Polymer Industry Publishing Center, Chemical Industry Publishing Company, Sep. 30, 2000, pp. 96-98.
Zhou Xiangxing, "Chinese Plastic Product Formulation Book", China Material Publishing Company, May 31, 1999, pp. 781-783.

\* cited by examiner

POUCH CASE FOR SECONDARY BATTERY AND POUCH-TYPE SECONDARY BATTERY COMPRISING THE SAME

FIELD OF THE INVENTION

The present application claims priority to and the benefits of Korean Patent Application No. 10-2015-0045310 filed with the Korean Intellectual Property Office on Mar. 31, 2015, the entire contents of which are incorporated herein by reference.

The present disclosure relates to a pouch case and a pouch-type secondary battery comprising the same, and in particular, to a pouch case provided with a moisture sensing function and comprising inner resin layer/middle resin layer/outer resin layer, and a pouch-type secondary battery comprising the same.

DESCRIPTION OF THE RELATED ART

With increases in the technology development and demands for mobile devices, demands for secondary batteries as an energy source have rapidly increased, and accordingly, researches on secondary batteries capable of responding to various demands have emerged.

In terms of secondary battery shapes, demands for prismatic-type lithium secondary batteries and pouch-type lithium secondary batteries having a small width capable of being used in products such as mobile phones are high, and in terms of materials, demands for lithium cobalt polymer secondary batteries having excellent energy density, discharge voltage and safety are high.

The prismatic-type lithium secondary batteries are favorable to protect an electrode assembly from external shock compared to the pouch-type lithium secondary batteries, and have a simple electrolyte injection process, but have a disadvantage in decreasing the volumes due to their fixed shapes. Accordingly, electrical products using such prismatic-type lithium secondary batteries as a power supply have a disadvantage in that designs thereof are limited. In addition, the prismatic-type lithium secondary batteries have disadvantages of not having a smooth venting effect releasing gas or liquid in terms of safety, and accordingly, have a high risk of explosion as internal heat or gas accumulates, and have a short time span inducing cell degeneration due to overheating caused by the heat that has not been released.

Meanwhile, the pouch-type lithium secondary batteries do not have limit in shapes and sizes, are readily assembled through thermal bonding, and have a favorable venting effect releasing gas or liquid when abnormal behaviors occur, which leads to an advantage of higher safety than the prismatic-type secondary batteries. Accordingly, the pouch-type secondary batteries are particularly suitable for manufacturing cells having a small thickness. However, unlike the prismatic-type secondary batteries, the pouch-type secondary batteries use a soft pouch having a small thickness as a case container, and therefore, have a disadvantage of weak physical and mechanical strength and low sealing reliability.

Accordingly, researches on the development of pouch cases stable under an electrochemical reaction inside a battery and even under a high temperature and high humidity external condition have been expanded.

When examining a section of the pouch-type case, the pouch-type case comprises, as shown in FIG. 1, an inner layer (11) as a sealing unit having a thermal adhesive property and thereby performing a role of a sealant, a metal layer (17) performing a role of a moisture and oxygen barrier layer while maintaining mechanical strength, and an outer layer (19) functioning as a substrate protective layer.

Herein, even when connecting an inner layer (sealing unit) of a cover unit and an inner layer (sealing unit) of a storage unit in the pouch case, complete sealing of a secondary battery is difficult to be secured. Particularly, an adhesive polymer such as polypropylene used for connecting the inner layers tends to be weak to moisture penetration in a high temperature and high humidity environment during a manufacturing process, which leads to a problem of moisture penetration between connecting units of the cover unit and the storage unit.

Secondary batteries use an electrolyte solution dissolving an electrolyte and additives in a non-aqueous solvent such as carbonates, and as the electrolyte, fluoride-based compounds having a favorable property in terms of interaction with conductive metals and the like are often used.

When moisture penetrates into a secondary battery, corrosion of an electrode assembly, a tap and a case (metal layer) is facilitated while hydrogen fluoride is isolated from the fluoride by the moisture, and battery performance may degrade. Besides, deterioration of a battery and gas generation are facilitated by various side reactions caused by moisture, which may cause a lifespan decrease and explosion of the secondary battery.

Accordingly, mass production methods capable of manufacturing reliable secondary batteries by distinguishing secondary batteries of which performance degrades due to moisture penetration during the manufacture of secondary batteries have been required.

DISCLOSURE OF THE INVENTION

Technical Problem

In view of the above, the present invention provides a pouch case for a secondary battery provided with a moisture sensing function so as to sense and distinguish secondary batteries of which performance degrades due to moisture penetration during a manufacturing process.

The present invention provides a pouch-type secondary battery comprising the pouch case for the secondary battery.

Technical Solution

One embodiment of the present disclosure provides a pouch case for a secondary battery fabricated by laminating an inner resin layer, a middle resin layer and an outer resin layer, wherein the inner resin layer comprises a polyolefin-based resin and a thermosetting moisture absorber.

Herein, typical examples of the thermosetting moisture absorber (super-absorbent polymer; SAP) may comprise at least one selected from the group consisting of acrylate-based copolymers in which at least one monomer such as acrylic acid or acrylamide are grafted, ethylene maleic anhydride copolymers, carboxymethylcellulose and polyethylene oxide.

The thermosetting moisture absorber may be comprises in an amount of from approximately 1 wt % to 5 wt % based on the total weight of the polyolefin-based resin as an adhesive polymer, and may be evenly dispersed in the polyolefin-based resin.

In addition, the inner resin layer may be prepared by grinding the thermosetting moisture absorber to prepare thermosetting moisture absorber powder; preparing a polyolefin-based resin solution; dispersing the thermosetting moisture absorber powder into the polyolefin-based resin solution; and extruding the thermosetting moisture absorber powder-dispersed polyolefin-based resin solution to prepare a film.

Another embodiment of the present disclosure provides a pouch-type secondary battery comprising an electrode assembly; and the pouch case of the present disclosure accommodating the electrode assembly.

Advantageous Effects

By providing a pouch case for a secondary battery formed with an inner resin layer comprising a polyolefin-based resin and a thermosetting moisture absorber, a middle resin layer and an outer resin layer, the present disclosure can sense and distinguish secondary batteries of which performance degrades due to moisture penetration during the manufacture of secondary batteries. As a result, reliability and production yields of pouch-type secondary batteries can be enhanced.

Figure 1:
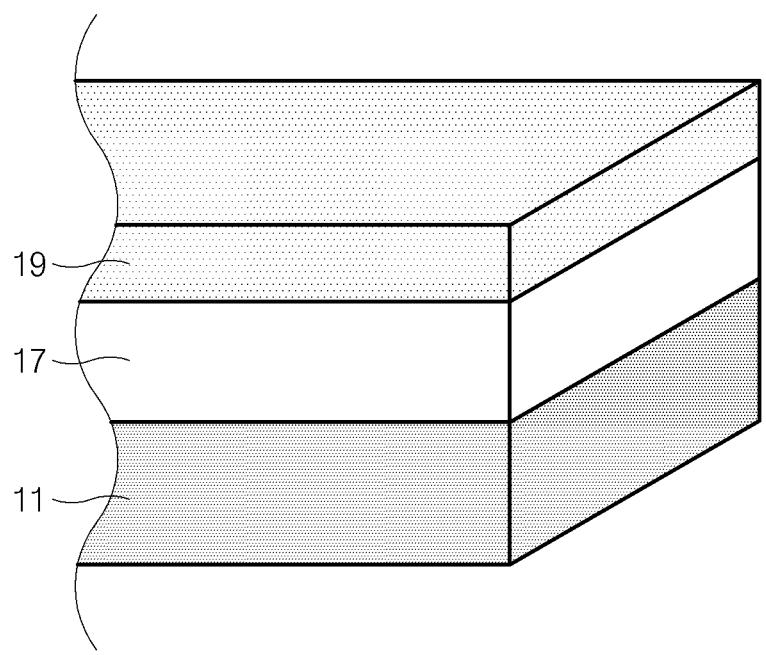
FIG. 1 is a sectional view schematically showing a general pouch case.

REFERENCE NUMERAL 11, 21: Inner Resin Layer
17: Metal Layer
19, 27: Outer Resin Layer
23: Thermosetting Moisture Absorber Particles Prior to Moisture Absorption
23-1: Thermosetting Moisture Absorber Particles after Moisture Absorption
25: Middle Resin Layer

MODE FOR CARRYING OUT THE INVENTION

Hereinafter, the present invention will be described in more detail in order to illuminate the present invention. Herein, terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

In view of the above, the present disclosure provides a pouch case for a secondary battery fabricated by laminating an inner resin layer, a middle resin layer and an outer resin layer, wherein the inner resin layer includes a polyolefin-based resin and a thermosetting moisture absorber.

In addition, one embodiment of the present disclosure comprises an electrode assembly; and the pouch case of the present disclosure accommodating the electrode assembly.

Hereinafter, the present disclosure will be described in more detail with reference to attached drawings as follows.

First, the pouch case for a secondary battery according to one embodiment of the present disclosure comprises as shown in the following FIG. 2, an inner resin layer (21) as a sealing unit performing a role of a sealant by a thermal adhesive property, a middle resin layer (25) preventing a side reaction by blocking moisture penetration and charge transfer while maintaining mechanical strength, and an outer resin layer (27) functioning as a protective layer.

Specifically, the inner resin layer comprises a polyolefin-based resin, an adhesive polymer, as a main component in order to secure an adhesive property.

Typical examples of the polyolefin-based resin may comprise at least one selected from the group consisting of oriented or casted polypropylene copolymers (CPP), polyethylene copolymers, ethylene-propylene copolymers, and copolymers of polypropylene and acrylic acid.

Particularly, in the pouch case for the secondary battery of the present disclosure, the inner resin layer may further comprise a thermosetting moisture absorber (23) turning into a gel when adsorbing moisture, increasing in a volume in order to distinguish moisture penetrability.

Typical examples of the thermosetting moisture absorber (super-absorbent polymer; SAP) may comprise at least one selected from the group consisting of acrylate-based copolymers in which at least one monomer such as acrylic acid or acrylamide are grafted, ethylene maleic anhydride copolymers, carboxymethylcellulose, and polyethylene oxide.

The thermosetting moisture absorber may be included in at an amount of from approximately 1 wt % to 5 wt % based on the total weight of the polyolefin-based resin, an adhesive polymer, and may be dispersed in the polyolefin-based resin.

When the thermosetting moisture absorber is included in less than 1 wt %, the material is difficult to be evenly dispersed in the whole polyolefin-based resin, and the degree of moisture absorption is also difficult to be visually observed, which leads to an insignificant effect of sensing penetration of moisture into a pouch case. When included in greater than 5% by weight, adhesive strength by the adhesive polymer decreases leading to a disadvantage of weakening the structure of the inner resin layer.

Moreover, an average particle diameter of the thermosetting moisture absorber is preferable approximately 5 μm or less. Particularly, the thermosetting moisture absorber is capable of absorbing moisture enough to increase the weight to approximately 10 times or greater based on its initial weight.

Herein, the thermosetting moisture absorber particles having an initial particle diameter of greater than 5 μm is not preferable since it causes non-uniform thickness in a layer comprising the absorbent.

Figure 2:
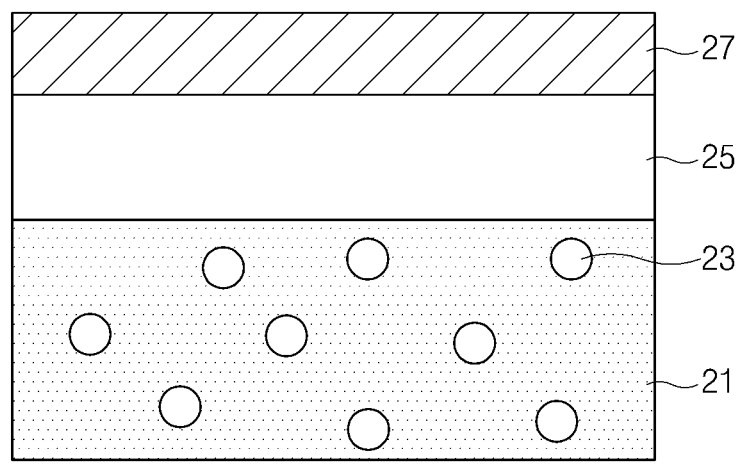
FIG. 2 is a sectional view schematically showing a pouch case structure according to one embodiment of the present disclosure.
Figure 3:
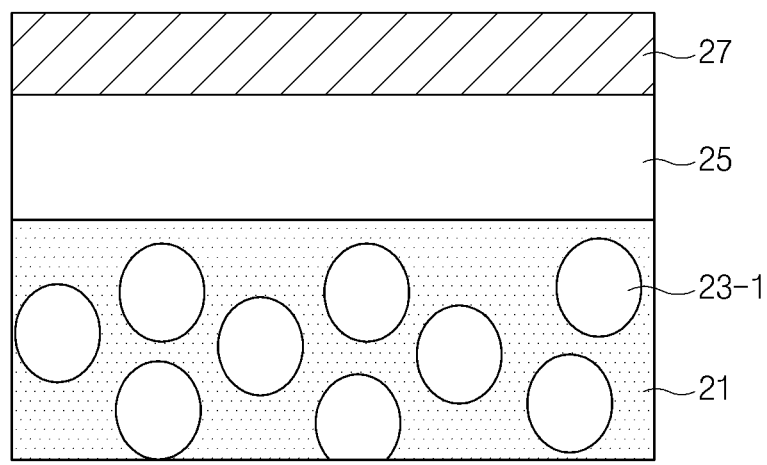
FIG. 3 is a sectional view schematically showing an internal change in a pouch case manufactured under a high temperature and high humidity environment according to one embodiment of the present disclosure.

Meanwhile, when referring to FIG. 2, the thermosetting moisture absorber (23) is invisible since an average particle diameter of the particles is approximately 5 μm or less. However, when referring to FIG. 3, the thermosetting moisture absorber (23) particles are swollen up to 10 times or higher (23-1) by absorbing moisture penetrating into the pouch, and the size increases to be visible. Accordingly, the degree of moisture absorption inside the pouch is visible without complex measuring methods by observing sizes of the thermosetting moisture absorber particles, changes in the thickness of the pouch case and the like.

In addition, in the pouch case of the present disclosure, the inner resin layer may be prepared by grinding the thermosetting moisture absorber to prepare thermosetting moisture absorber powder (step 1); dispersing the thermosetting moisture absorber powder into a polyolefin-based resin solution (step 2); and extruding the thermosetting moisture absorber powder-dispersed polyolefin-based resin solution to prepare a film (step 3).

The grinding of the (step 1) may be carried out for from 10 minutes to 30 minutes at from 1000 rpm to 5000 rpm using a shear-rupturing dry apparatus.

The polyolefin-based resin solution of the (step 2) may be prepared by melting the polyolefin-based resin, or dissolving the polyolefin-based resin in a solvent such as toluene.

In the (step 3), the inner resin layer may be prepared to a thickness of from approximately 20 μm to 100 μm by extruding the thermosetting moisture absorber powder-dispersed polyolefin-based resin solution.

Herein, in the pouch case of the present disclosure, a thickness of the inner resin layer is preferable from 20 μm to 100 μm. When the thickness of the inner resin layer is greater than 100 μm, loss occurs in terms of energy density as a pouch case for a secondary battery, and when the thickness of the inner resin layer is less than 20 μm, a role of a sealing layer is difficult to be achieved leading to a problem of readily allowing moisture penetration.

As described above, the thermosetting moisture absorber powder is dispersed into a polyolefin-based resin solution, and then the result is extruded into a film when forming the inner resin layer in the present disclosure so that the thermosetting moisture absorber is evenly distributed in the inner resin layer.

In the pouch case of the present disclosure, the middle resin layer may be prepared by extruding a metal layer such as aluminum used in the art, or a cyclic olefin-based resin layer having an excellent electrolyte resistance property instead of the metal layer.

Herein, typical examples of the cyclic olefin-based resin may comprise those prepared by extruding a norbornene-based resin, a tetracyclododecene acrylate-based resin or the like.

Herein, a thickness of the middle resin layer is preferably from 60 μm to 100 μm.

Like the inner resin layer, the middle resin layer may be prepared by melting the cyclic olefin-based resin or dissolving the cyclic olefin-based resin in a solvent, extruding and filming the result, and then applying or laminating the result on the inner resin layer.

In addition, in the pouch case of the present disclosure, the outer resin layer may specifically comprise at least one layer selected from the group consisting of polyethylene, polypropylene, polyethylene terephthalate, nylon, low density polyethylene (LDPE), high density polyethylene (HDPE) and linear low density polyethylene (LLDPE).

A thickness of the outer resin layer may be from 10 μm to 100 μm.

In the pouch case of the present disclosure, the inner resin layer, the middle resin layer and the outer resin layer may be each connected using common methods used in the preparation of a pouch case. Specifically, raw materials of the inner resin layer, the middle resin layer and the outer resin layer are each melted, extruded or casted, and consecutively laminate molded to be prepared, or the resin raw materials are melted, extruded or casted to be prepared into a film, and then heat laminated, or the films may be connected using an olefin-based adhesive.

As described above, the inner resin layer of the pouch case for the secondary battery comprises a material turning into a gel when absorbing moisture in the present disclosure, and therefore, a moisture penetration sensing function capable of distinguishing moisture penetrability may be provided. Accordingly, when a cycle test is carried out by preparing a battery cell through a forming process in the manufacture of pouch-type secondary batteries, secondary batteries having degraded performance due to moisture penetration may be sensed and distinguished by observing a gelation behavior of the inner resin layer, and as a result, production yields of pouch-type secondary batteries with enhanced reliability may increase.

In addition, the present disclosure provides a pouch-type secondary battery comprising an electrode assembly; and the pouch case of the present disclosure accommodating the electrode assembly.

Herein, the electrode assembly is fabricating by insulating and winding a negative electrode comprising a negative electrode active material, a positive electrode comprising a positive electrode active material and a separator in between.

The positive electrode is prepared by coating positive electrode active material slurry comprising a positive electrode active material, a conductor and a binder on a positive electrode collector, and then drying and rolling the result. As necessary, a filler may be further added to the positive electrode active material slurry.

Herein, the positive electrode active material may be mixed and used with compounds comprising a majority of lithium intercalation materials such as layer compounds such as lithium cobalt oxide ($LiCoO_2$) or lithium nickel oxide ($LiNiO_2$) or compounds substituted with at least one transition metals; lithium manganese oxides ($LiMnO_2$) such as a chemical formula of $Li_{1+x}Mn_{2-x}O_4$ (herein, x is from 0 to 0.33), $LiMnO_3$, $LiMn_2O_3$ and $LiMnO_2$; lithium copper oxides ($Li_2CuO_2$); vanadium oxides such as $LiV_3O_8$, $LiFe_3O_4$, $V_2O_5$ and $Cu_2V_2O_7$; lithiated nickel oxides represented by a chemical formula of $LiNi_{1-x}M_xO_2$ (herein, M is Co, Mn, Al, Cu, Fe, Mg, B or Ga, and x is from 0.01 to 0.3); lithium manganese complex oxides represented by a chemical formula of $LiNi_{2-x}M_xO_2$ (herein, M is Co, Ni, Fe, Cr, Zn or Ta, and x is from 0.01 to 0.1) or $Li_2Mn_3MO_8$ (herein, M is Fe, Co, Ni, Cu or Zn); $LiMn_2O_4$ in which some of lithium in the chemical formula are substituted with alkali earth metals; disulfide compounds; and complex oxides prepared by $Fe_2(MoO_4)_3$ or a combination thereof.

The positive electrode collector is generally prepared to a thickness of from 3 μm to 500 μm. Such a positive electrode collector is not particularly limited as long as it has high conductivity without inducing chemical changes in the corresponding battery. For example, stainless steel, aluminum, nickel, titanium, baked carbon, or aluminum or stainless steel of which surface is treated with carbon, nickel, titanium, silver or the like, may be used. The collector may increase adhesive strength of the positive electrode active material by preparing fine unevenness on the surface, and various forms such as films, sheets, foil, nets, porous bodies, foams and non-woven fabrics may be used.

The conductor is normally added in from 1 wt % to 50 wt % based on the total weight of a mixture comprising the positive electrode active material. Such a conductor is not particularly limited as long as it has conductivity without inducing chemical changes in the corresponding battery, and examples thereof may comprise graphite such as natural graphite or artificial graphite; carbon black such as acetylene black, Ketjen black, channel black, furnace black, lamp black or thermal black; conductive fiber such as carbon fiber or metal fiber; metal powder such as fluorocarbon, aluminum or nickel powder; conductive whiskers such as zinc oxide or potassium titanate; conductive oxides such as titanium oxide; conductive materials such as polyphenylene derivatives, and the like.

The binder is a component assisting binding of the active material, the conductor and the like, and binding for the collector, and normally added in 1 wt % to 50 wt % with respect to the total weight of a mixture comprising the positive electrode active material. Examples of such a binder may comprise polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene ter polymers (EPDM), a sulfonated EPDM, styrene-butadiene rubber, fluorine rubber, various copolymers and the like.

The filler is a component suppressing expansion of a positive electrode, which may be used as necessary, and is not particularly limited as long as it is a fibrous material that does not induce chemical changes in the corresponding battery, and examples thereof may comprise olefin-based polymers such as polyethylene or polypropylene; or a fibrous material such as glass fiber or carbon fiber.

In addition, the negative electrode is prepared by coating negative electrode active material slurry comprising a negative electrode active material, a conductor and a binder on a negative electrode collector, and then drying and rolling the result. As necessary, a filler may be further added to the negative electrode active material slurry.

The negative electrode collector is generally prepared to a thickness of from 3 μm to 500 μm. Such a negative electrode collector is not particularly limited as long as it has conductivity without inducing chemical changes in the corresponding battery, and examples thereof may comprise copper, stainless steel, aluminum, nickel, titanium, baked carbon, or copper or stainless steel of which surface is treated with carbon, nickel, titanium, silver or the like, aluminum-cadmium alloys, or the like. In addition, like the positive electrode collector, the negative electrode collector may increase binding strength of the negative electrode active material by fabricating fine unevenness on the surface, and various forms such as films, sheets, foil, nets, porous bodies, foams and non-woven fabrics may be used.

The negative electrode material comprises amorphous carbon or crystalline carbon, and specifically, may use carbon such as hard carbon and graphite-based carbon; metal complex oxides such as $Li_xFe_2O_3$ ($0 \leq x \leq 1$), $Li_xWO_2$ ($0 \leq x \leq 1$), $Sn_xMe_{1-x}Me'yO_z$ (Me: Mn, Fe, Pb, Ge; Me': Al, B, P, Si, elements of groups 1, 2 and 3 in the periodic table, halogen; $0 < x \leq 1$; $1 \leq y \leq 3$; $1 \leq z \leq 8$); lithium metal; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ or $Bi_2O_5$; conductive polymers such as polyacetylene; Li—Co—Ni-based materials and the like.

In addition, the binder needs to perform a buffering role for expansion and contraction of electrode active materials caused from lithium ion intercalation and deintercalation in the electrode, and therefore, is preferably a polymer having elasticity. The binder comprises a rubber-based binder synthesized by aqueous emulsion polymerization. Typical examples of the rubber-based binder may include at least one selected from the group consisting of acrylonitrile rubber, butadiene rubber and styrene butadiene rubber (SBR).

The separator places between the positive electrode and the negative electrode and insulates the electrodes. The separator is commonly known polyolefin-based separators, complex separators preparing an organic and inorganic complex layer on an olefin-based substrate, or the like. The separator may be used without particular limit.

A battery is fabricated by storing the electrode collector in a pouch case, and injecting an electrolyte solution thereto.

The electrolyte solution according to the present disclosure is a lithium salt-containing non-aqueous electrolyte, and consists of a non-aqueous electrolyte and lithium. As the non-aqueous electrolyte, a non-aqueous electrolyte solution, a solid electrolyte, an inorganic solid electrolyte and the like may be used.

Examples of the non-aqueous electrolyte solution may comprise an aprotic organic solvent such as N-methyl-2-pyrrolidinone, propylene carbonate, ethylene carbonate, butylene carbonate, dimethyl carbonate, diethyl carbonate, Y-butyrolactone, 1,2-dimethoxyethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte may comprise polyethylene derivatives, polyethylene oxide derivatives, polypropylene oxide derivatives, phosphate ester polymers, poly agitation lysine, polyester sulfide, polyvinyl alcohol, polyvinylidene fluoride, polymers comprising ionic dissociation groups, and the like.

Examples of the inorganic solid electrolyte may comprise nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material favorably dissolved in the non-aqueous electrolyte, and examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, 4-phenyl lithium borate, imide and the like.

In addition, for improving charge and discharge properties, flame retardancy and the like, compounds such as pyridine, triethyl phosphite, triethanolamine, cyclic ether, ethylenediamine, n-glyme, hexaphosphate triamide, nitrobenzene derivatives, sulfur, quinone imine dyes, N-substituted oxazolidinone, N,N-substituted imidazolidine, ethylene glycol dialkyl ethers, ammonium salts, pyrrole, 2-methoxyethanol and aluminum trichloride may be added to the non-aqueous electrolyte. In some cases, in order to provide nonflammability, halogen-containing solvents such as carbon tetrachloride and trifluoroethylene may be further included, and carbon dioxide gas may be further included for enhancing a high temperature storage property.

Meanwhile, such a pouch-type secondary battery is preferably a lithium secondary battery, but is not limited thereto.

The pouch-type secondary battery of the present disclosure may be used as a unit battery of a battery module for a power supply of medium and large sized devices.

EXAMPLE

Example 1

(Preparation of Inner Resin Layer)
Carboxymethylcellulose, a thermosetting moisture absorber, was ground for 20 minutes using a shear-rupturing apparatus while rotating at 3000 rpm to prepare carboxymethylcellulose powder (an average particle diameter: 1 μm).

Subsequently, the carboxymethylcellulose powder (3 wt %) was dispersed into a polypropylene resin solution, and then the result was extruded at approximately 220° C. to prepare an inner resin layer having a thickness of 40 μm.

(Fabrication of Pouch Case Sheet)

A norbornene resin having a thickness of 60 μm was laminated on the inner resin layer in a laminating manner to prepare a middle resin layer.

Next, an outer resin layer consisted of nylon of a 15 μm thickness was laminated on the middle resin layer to fabricate a pouch case for a secondary battery.

Example 2

(Preparation of Inner Resin Layer)

An acrylic acid-acrylamide copolymer was ground for 20 minutes using a shear-rupturing apparatus while rotating at 3000 rpm to prepare acrylic acid-acrylamide copolymer powder (an average particle diameter: 1 μm).

Subsequently, the acrylic acid-acrylamide copolymer powder (5 wt %) was dispersed into a polypropylene resin solution, and then the result was extruded at approximately 220° C. to prepare an inner resin layer having a thickness of 40 μm.

(Fabrication of Pouch Case Sheet)

A norbornene resin having a thickness of 60 μm was laminated on the inner resin layer in a laminating manner to form a middle resin layer.

Next, an outer resin layer consisting of nylon of a 15 μm thickness was laminated on the middle resin layer to fabricate a pouch case for a secondary battery.

Example 3

An ethylene maleic anhydride copolymer was ground for 20 minutes using a shear-rupturing apparatus while rotating at 3000 rpm to prepare ethylene maleic anhydride copolymer powder (an average particle diameter: 1 μm).

Subsequently, the ethylene maleic anhydride copolymer powder (1 wt %) was dispersed into a polypropylene and acrylic acid copolymer resin solution, and then the result was extruded and released at approximately 220° C. to prepare a polypropylene inner resin layer having a thickness of 40 μm.

(Fabrication of Pouch Case Sheet)

A norbornene resin having a thickness of 60 μm was laminated on the inner resin layer in a laminating manner to prepare a middle resin layer.

Next, an outer resin layer formed with nylon of a 15 μm thickness was laminated on the middle resin layer to fabricate a pouch case for a secondary battery.

Comparative Example 1

Carboxymethylcellulose, a thermosetting moisture absorber, was ground for 20 minutes using a shear-rupturing apparatus while rotating at 3000 rpm to prepare carboxymethylcellulose powder (average particle diameter 6 μm).

Subsequently, the carboxymethylcellulose powder (5% by weight) was dispersed into a polypropylene resin solution, and then the result was extruded at approximately 220° C. to prepare an inner resin layer having a thickness of 40 μm.

(Fabrication of Pouch Case Sheet)

A norbornene resin having a thickness of 60 μm was laminated on the inner resin layer in a laminating manner to prepare a middle resin layer.

Next, an outer resin layer formed with nylon of a 15 μm thickness was laminated on the middle resin layer to fabricate a pouch case for a secondary battery.

Comparative Example 2

Carboxymethylcellulose, a thermosetting moisture absorber, was ground for 20 minutes using a shear-rupturing apparatus while rotating at 3000 rpm to prepare carboxymethylcellulose powder (average particle diameter 5 μm).

Subsequently, the carboxymethylcellulose powder (6% by weight) was dispersed into a polypropylene resin solution, and then the result was extruded at approximately 220° C. to prepare an inner resin layer having a thickness of 40 μm.

(Fabrication of Pouch Case Sheet)

A norbornene resin having a thickness of 60 μm was laminated on the inner resin layer in a laminating manner to prepare a middle resin layer.

Next, an outer resin layer formed with nylon of a 15 μm thickness was laminated on the middle resin layer to fabricate a pouch case for a secondary battery.

Comparative Example 3

Carboxymethylcellulose, a thermosetting moisture absorber, was ground for 20 minutes using a shear-rupturing apparatus while rotating at 3000 rpm to prepare carboxymethylcellulose powder (average particle diameter 5 μm).

Subsequently, the carboxymethylcellulose powder (5% by weight) was dispersed into a polypropylene resin solution, and then the result was extruded at approximately 220° C. to prepare an inner resin layer having a thickness of 110 μm.

(Fabrication of Pouch Case Sheet)

A norbornene resin having a thickness of 60 μm was laminated on the inner resin layer in a laminating manner to prepare a middle resin layer.

Next, an outer resin layer formed with nylon of a 15 μm thickness was laminated on the middle resin layer to fabricate a pouch case for a secondary battery.

Test Example 1

The pouch case sheets of Examples 1 to 3 and Comparative Examples 1 to 3 were each stored for 7 days in a 60° C. oven having 90% humidity, and then the sections were identified.

Herein, gelation of the thermosetting moisture absorber powder inside the pouch case sheets of Examples 1 to 3 and Comparative Examples 1 to 3 was visually observed.

However, in the pouch case sheet of Comparative Example 1, it was seen that the thermosetting moisture particles inside the pouch had large particle diameters causing thickness non-uniformity in the inner resin layer, which leaded to adhesive strength degradation of the pouch case. In the pouch case sheet of Comparative Example 2, it was seen that adhesive strength between the resin layers degraded due to high content of the thermosetting moisture particles inside the pouch.

Meanwhile, in the pouch case sheet of Comparative Example 3, the volume of the secondary battery increased due to the inner resin layer thickness while adhesive strength was enhanced, and loss may occur in terms of energy density.

From such results, secondary batteries having degraded performance due to moisture penetration may be readily sensed and distinguished visually when fabricating secondary batteries. Accordingly, reliability and production yields of pouch-type secondary batteries may be enhanced.

What is claimed is:

1. A pouch case for a secondary battery fabricated by laminating an inner resin layer, a middle resin layer and an outer resin layer, wherein the inner resin layer comprises a polyolefin-based resin and a thermosetting moisture absorber, wherein the thermosetting moisture absorber comprises at least one selected from the group consisting of acrylate-based copolymers, ethylene-maleic anhydride copolymers, carboxymethylcellulose and polyethylene oxide, and wherein the thermosetting moisture absorber is prepared to powder having a particle diameter of from 1 μm to 5 μm by grinding.

2. The pouch case for the secondary battery of claim 1, wherein the polyolefin-based resin comprises at least one selected from the group consisting of oriented or casted polypropylene copolymers, polyethylene copolymers, ethylene-propylene copolymers, and copolymers of polypropylene and acrylic acid.

3. The pouch case for the secondary battery of claim 1, wherein the thermosetting moisture absorber is comprised in an amount of from 1 wt % to 5 wt % based on the total weight of the polyolefin-based resin.

4. The pouch case for the secondary battery of claim 1, wherein the thermosetting moisture absorber is dispersed in the polyolefin-based resin.

5. The pouch case for the secondary battery of claim 1, wherein the inner resin layer is prepared by grinding the thermosetting moisture absorber to prepare thermosetting moisture absorber powder; dispersing the thermosetting moisture absorber powder into a polyolefin-based resin solution; and extruding the thermosetting moisture absorber powder-dispersed polyolefin-based resin solution to prepare a film.

6. The pouch case for the secondary battery of claim 1, wherein a thickness of the inner resin layer is from 20 μm to 100 μm.

7. The pouch case for the secondary battery of claim 1, wherein the middle resin layer comprises a cyclic olefin-based resin.

8. The pouch case for the secondary battery of claim 1, wherein a thickness of the middle resin layer is from 60 μm to 100 μm.

9. The pouch case for the secondary battery of claim 1, wherein the outer resin layer comprises at least one selected from the group consisting of polyethylene, polypropylene, polyethylene terephthalate, nylon, low-density polyethylene (LDPE), high-density polyethylene (HDPE) and linear low-density polyethylene (LLDPE).

10. The pouch case for the secondary battery of claim 1, wherein a thickness of the outer resin layer is from 10 μm to 100 μm.

11. A pouch-type secondary battery comprising: an electrode assembly; and the pouch case for the secondary battery of claim 1 accommodating the electrode assembly.

12. The pouch-type secondary battery of claim 11, which is used as a unit battery of a battery module for a power supply of medium and large sized devices.

* * * * *